United States Patent Office 3,500,705
Patented Mar. 17, 1970

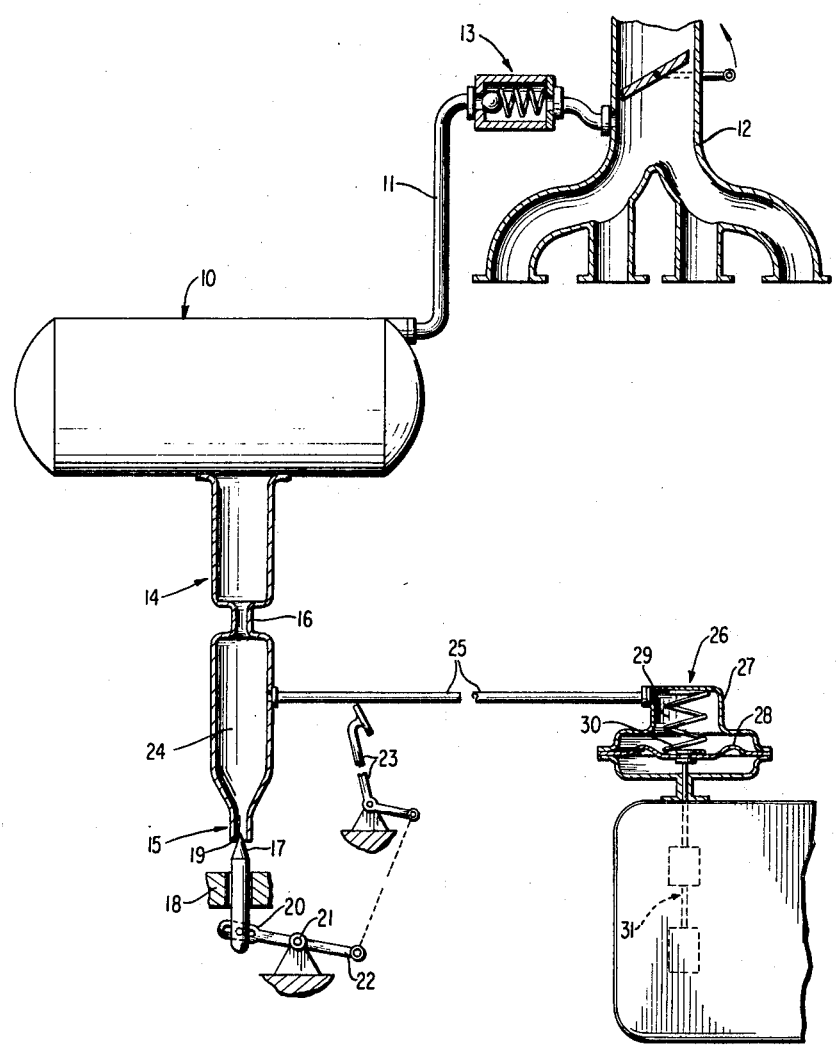

3,500,705
INSTALLATION FOR THE CONTROL OF AUTOMATICALLY SHIFTING MOTOR VEHICLE TRANSMISSIONS
Hans-Joachim M. Forster, Stuttgart-Riedenberg, Germany, assignor to Daimler-Benz Aktiengesellschaft, Stuttgart-Unterturkheim, Germany
Filed Feb. 29, 1968, Ser. No. 709,453
Claims priority, application Germany, Mar. 3, 1967, D 52,429
Int. Cl. B60k 21/00
U.S. Cl. 74—863          15 Claims

ABSTRACT OF THE DISCLOSURE

An installation for the control of automatically shifted motor vehicle transmissions in which the shifting pulse is controlled, inter alia, in dependence on the torque of the driving engine and in which a vacuum source is available with an essentially constant pressure whereby a torque transmitter device of the engine acts on an adjustable first throttle in a line leading from the atmosphere to the vacuum source and a second throttle is connected downstream of the first throttle so that the space between the first and second throttle reflects by is pressure condition the torque of the engine; this space is then connected by way of a line with the control member of the transmission shifting installation which triggers the pulses dependent on the torque.

BACKGROUND OF THE INVENTION

The present invention relates to an installation for the control of automatically shifting motor vehicle change-speed transmissions in which the shifting pulses are controlled, inter alia, in dependence on the torque of the driving engine and whereby a vacuum source, for example, a vacuum-brake servo-device, is present in the vehicle which has an essentially constant pressure.

With the known installations of the aforementioned type, vacuum in the suction pipe of the engine serves generally as measure for the torque. This has, inter alia, the advantage that no separate, special linkages are necessary for the transmission to the change-speed gear, but only a pipe line is necessary which does not require much space and can be readily accommodated as well as displaced. In modern types of engines, however, the fuel quantity is influenced by so many additional factors that the vacuum in the suction pipe of the engine does not produce any longer a sufficiently accurate measure for the torque. One is therefore forced to change to other torque-indicating and transmitting devices. However, it is desirable in connection therewith to operate without mechanical linkages and to retain the thus advantageous transmission by means of a pressure line which can be readily accommodated and laid-out in the available space.

SUMMARY OF THE INVENTION

The present invention aims at a solution to the aforementioned problems and solves this aim with the installations of the type described above in that a torque-indicating transmitter device of the engine acts on an adjustable first throttle disposed in a line leading from the atmosphere to the vacuum source, in that a constant second throttle is connected behind or downstream of the first throttle and in that the space between the first and second throttle is connected by way of a line with the control member of the transmission shifting installation which triggers the pulses dependent on the torque. According to the present invention, both throttles are matched to each other in such a manner that the pressure produced between the same is a measure for the position and adjustment of the transmitter device. With carburetor engines, the throttle valve or the gas pedal and with injection-type engines, the control rack of the injection pump serves as transmitter device.

With the installation according to the present invention, mechanical linkages or hydraulic or electrical transmissions are avoided. An easily accommodated and assembled pneumatic transmission results in this manner which can be readily engineered in the available space. This has additionally the advantage that the transmitter device, for example, the control rack of an injection pump does not have to produce any additional forces for the adjustment. Furthermore, this transmission has the advantage that it operates completely satisfactorily also with low and even the lowest temperatures.

Accordingly, it is an object of the present invention to provide an installation for the control of automatic change-speed gears for motor vehicles which is simple in construction and eliminates in a reliable and effective manner the shortcomings encountered in the prior art constructions.

Another object of the present invention resides in an installation for the control of automatic change-speed gears for motor vehicles in which the transmission control utilizes a measure accurately reflecting the torque of the engine.

A further object of the present invention resides in a control system for automatic change-speed transmissions which obviates the need for mechanical linkages while permitting a control of the transmission in accordance with the torque of the engine.

Still another object of the present invention resides in a control system for automatic change-speed gears which utilizes an easily installed pneumatic line for controlling the initiation of the shifting operations in dependence on the position of the transmitter device, reflecting the torque of the engine.

These and further objects, features, and advantages of the present invention will become more obvious from the following description when taken in connection with the accompanying drawing which shows, for purposes of illustration only, one embodiment in accordance with the present invention, and wherein the single figure is a schematic view of the transmission installation in accordance with the present invention for an automatic motor vehicle change-speed gear.

Referring now to the drawing, reference numeral 10 generally designates a conventional vacuum tank provided in the motor vehicle which may serve, for example, for the brake-servo system. This tank 10 has a sufficient size and an essentially constant pressure prevails in the same. For purposes of producing this vacuum or for its continuous maintenance, the tank 10 is connected by way of a line 11 in a conventional manner with the suction pipe or intake manifold 12 of the engine. A check valve generally designated by reference numeral 13 is provided in the line 11 which prevents an unintentional filling in the case that no vacuum exists in the suction pipe 12 of the engine.

A line generally designated by reference numeral 14 leads to the tank 10 through which atmospheric air is able to enter the tank 10. An adjustable first throttle generally designated by reference numeral 15 and a second constant throttle 16 are arranged in series in this line 14. The first throttling place 15 is appropriately disposed at the orifice of the line 14. It is constituted by a conical pin 17 which can be moved within its guidance 18 in the direction of its longitudinal axis more or less into the orifice 19 of the line 14. A lever 20 engages the end of the pin 17 which lever is fixedly supported at 21 and is connected with the other end 22 thereof with the torque-transmitter device, in this case, with the gas pedal 23 of the vehicle. The two throttles 14 and 15 are now so matched to each other that a pressure results in the space 24 between the two throttles which is an accurate measure for the position of the torque-transmitter device, i.e., in this case of the gas pedal 23. This space 24 is now connected by way of a line 25 with that control member generally designed by reference numeral 26 which produces in the transmission shifting installation—which is constructed as shifting installation actuated by a pressure medium in a conventional manner—a pressure in dependence on the torque. The common slide valves of the transmission shifting installation are then actuated by this pressure in conjunction with the other pressure produced in a conventional manner in dependence on the vehicle velocity and shifting pulses are triggered thereby at the same.

The control device 26 is constructed as conventional diaphragm box. A space 29 is formed in the housing 27 by a diaphragm 28 in which is arranged a spring 30 and in which terminates the line 25. The diaphragm 28 is operatively connected with a conventional control slide valve generally designated by reference numeral 31 which is not illustrated in detail and which adjusts the pressure in the transmission shifting installation that is dependent on the torque. This slide valve 31 is moved by the spring 30 in one direction and is moved in the other direction by the vacuum supplied through the line 25 against the spring action. The operation and also the basic construction of such a diaphragm box inclusive the spool-type slide valve 31 for adjusting the modulating pressure are known, per se, and therefore are not described in greater detail herein. The present invention illustrates how such an arrangement can be retained even though, for reasons pointed out above, not the vacuum in the suction pipe is used in the usual manner as transmitter for the torque of the engine, but instead another device may serve for this purpose which would normally require mechanical or differently constructed transmissions.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are known to a person skilled in the art.

I claim:
1. An installation for the control of automatic change-speed gears for motor vehicles in which the shifting pulses are controlled, inter alia, in dependence on the torque of the driving engine and in which a vacuum source having an essentially constant pressure is available in the engine, wherein the improvement comprises torque indicator and transmitter means of the engine, line means leading from the atmosphere to said vacuum source, first adjustable throttle means operatively associated with said line means and second substantially constant throttle means operatively associated with said line means between said first adjustable throttle means and said vacuum source, said torque indicator and transmitter means being operatively connected with said first adjustable throttle means, change-speed gear shifting means including control means for producing shifting pulses in dependence on the torque, and connecting means operative connecting a space defined by said line means between said first adjustable throttle means and said second throttle means with said control means.

2. An installation according to claim 1, wherein said connecting means includes a line.
3. An installation according to claim 2, wherein said two throttle means are so matched to each other that the pressure produced between the same is a measure for the position of the torque-indicator and transmitter means.
4. An installation according to claim 3, wherein the engine is a carburetor engine having a gas pedal, and wherein said gas pedal forms the transmitter means.
5. An installation according to claim 3, wherein the engine is an injection-type engine having control rack means for its injection pump means, the control rack means serving as transmitter means.
6. An installation according to claim 1, wherein said two throttle means are so matched to each other that the pressure produced between the same is a measure for the position of the torque-indicator and transmitter means.
7. An installation according to claim 1, wherein the engine is a carburetor engine having a gas pedal, and wherein said gas pedal forms the transmitter means.
8. An installation according to claim 1, wherein the engine is an injection-type engine having control rack means for its injection pump means, the control rack means serving as transmitter means.
9. An installation for the control of automatic change-speed gears for motor vehicles in which the shifting pulses are controlled, inter alia, in dependence on the torque of the driving engine, comprising engine-torque indicator means, change-speed gear shifting means including control means for producing shifting pulses in dependence on the engine torque, and further means operatively connecting said indicator means with said control means including first means for producing an air pressure whose magnitude essentially corresponds to the prevailing engine torque and second means for actuating said control means by said air pressure.
10. An installation according to claim 9, wherein said first means includes a line leading from a higher air pressure source to a lower air pressure source and first adjustable throttle means and second throttle means in said line, the second means being operatively connected to said line between said two throttle means.
11. An installation according to claim 10, wherein said second means includes a line.
12. An installation according to claim 11, wherein said two throttle means are so matched to each other that the pressure produced between the same is a measure for the position of the indicator means.
13. An installation according to claim 9, wherein the engine is a carburetor engine having a gas pedal, and wherein said gas pedal forms the indicator means.
14. An installation according to claim 9, wherein the engine is an injection-type engine having control rack means for its injection pump means, the control rack means serving as indicator means.
15. An installation according to claim 9, wherein said two throttle means are so matched to each other that the pressure produced between the same is a measure for the position of the indicator means.

References Cited

UNITED STATES PATENTS

| 2,721,072 | 10/1955 | Zuhen et al. | |
| 2,938,403 | 5/1960 | Harrison et al. | 74—863 |
| 3,195,368 | 7/1965 | Boudewijn | 74—863 |

ARTHUR T. McKEON, Primary Examiner